United States Patent Office 3,206,414
Patented Sept. 14, 1965

3,206,414
METHOD OF PREPARING A CATALYST COMPOSITION COMPRISING NICKEL, IRON AND COPPER AND THE PRODUCT THEREOF
Arnold Gunther, Newark, N.J.
(293 N. Maple Ave., East Orange, N.J.)
No Drawing. Filed July 10, 1962, Ser. No. 208,915
6 Claims. (Cl. 252—474)

The present invention relates to a catalyst for the oxidation of combustible gases found in the exhaust fumes of internal combustion engines, as gasoline driven motor-vehicles and the like.

One of the objects of this invention is to provide a catalyst of such a nature as to initiate the oxidation of the combustible gases at substantially lower temperatures and concentrations than those required without any catalyst.

Another object of this invention is to provide a catalyst of such a nature as to substantially increase the velocity of oxidation or, in other words, the reaction rate, in order to get the reaction to completion in a very short time.

Still another object is to provide a catalyst with such a composition as to withstand for very extended periods of time the high temperatures developed in the course of the oxidation, and also to withstand the chemically corrosive actions of the reactants and products.

Other objects will be apparent from the following description. The exhaust fumes of the internal combustion engines have as main components the following gases: nitrogen, carbon dioxide, water vapor, carbon monoxide, hydrogen, oxygen, paraffinic and olefinic hydrocarbons, soot, very small amounts of nitrogen oxides, aldehydes, etc.

The temperature of the fumes and the relative percentages of the component gases vary widely with the load and speed of the engine.

Temperatures oscillating between about 250° C. for idling engine and 800° C. for full load and speed are commonly encountered in the operation of the Otto-cycle engines. The relative percentage of the constituent gases depend on many factors, as the carburation mixture, i.e., the ratio of air to fuel issuing from the carburator; the volumetric efficiency of the engine, the speed and load of the engine, etc. It is nevertheless possible to give some average compositions, without claiming any accuracy, but only a general order of magnitude.

With this in mind, it is also possible to state in general terms that the contents of carbon monoxide, hydrogen and hydrocarbons is higher at idling and low speeds and decreases with the increase of load and speed of the engine. The following Table No. 1 on the gas composition gives an idea of the order of magnitude.

Table No. 1.—Gas compositions of exhaust gases

|  | Idling | Accelerating | Cruising | Decelerating |
|---|---|---|---|---|
| CO | 4–6 | 0–6 | 1–4 | 2–4 |
| Hydrocarbons | 0.05–0.1 | 0.1–0.4 | 0.1–0.3 | 0.4–1.2 |
| $H_2$ | 1.5–3 | 0–3 | 0.3–2 | 0.6–1.5 |
| $CO_2$ | 6–8 | 6–12 | 8–11 | 8–10 |
| $H_2O$ | 12 | 12 | 12 | 12 |
| $N_2$ | 72 | 72 | 72 | 72 |
| $O_2$ | 2–3 | 0–3 | 0.5–2 | 1–2 |
| ° C. | 200–300 | 370–800 | 430–650 | 650–300 |

The figures refer to volume percent.
The hydrocarbons are referred to n-hexane.
Data on CO and hydrocarbons were taken from W. L. Faith, Air Pollution Control, pp. 199 (1959).
Other data were compiled and averaged from various references and the applicant's own data.

For these figures, the minimum amounts of air required for the combustion of CO, $H_2$, and hydrocarbons, as well as the temperatures of the combustible mixture are shown in the Table No. 2 under the assumption that air is taken at room temperature.

Table No. 2.—Exhaust gas-air mixtures final temperature

| | Gas-air ratio by volume | Concentrations in gas-air mixture by volume percent | | | Final temperature, ° C. |
|---|---|---|---|---|---|
| | | CO | $H_2$ | Hydrocarbons | |
| Idling | 100–28 | 4.7 | 2.4 | 0.08 | 245 |
| Accelerating | 100–43 | 4.2 | 2.1 | 0.28 | 565 |
| Cruising | 100–30 | 3.1 | 1.6 | 0.23 | 500 |
| Decelerating | 100–75 | 2.3 | 1.2 | 0.69 | 370 |

The highest exhaust gas temperatures, as well as the largest concentrations of the combustible gases, as shown in Table No. 1, were utilized for obtaining the above table.

By comparing these resulting concentrations with the following Table No. 3 on minimum and maximum inflammability limits, and the ignition temperatures of the gases concerned, it follows that combustion would not take place by itself.

Table No. 3.—Minimum and maximum inflammability limits and their ignition temperatures

| Gas | Min. inflammability limit, percent by volume | Max. inflammability limit, percent by volume | Ignition temperature, ° C. |
|---|---|---|---|
| CO | 6.3 | 71.2 | 643 |
| $H_2$ | 6.2 | 71.4 | 580 |
| Methane | 5.8 | 13.3 | 649 |
| n-Butane | 1.6 | 8.5 | 430 |
| n-Pentane | 1.4 | 8 | 310 |
| n-Hexane | 1.3 | 6.9 | 247 |

One obvious solution would be to raise the temperature of the gaseous mixture in order to increase the reaction speed to a practical value through the application of heat from a convenient external source or to have the gas pass through a flame.

Any of these means for attaining the combustion at a practical rate involves the expenditure of heat, that makes it uneconomical. Another solution is to pass the gaseous mixture through a suitable catalyst, that increases the reaction rate to a practical value, without any expenditure of energy, external to the system gas-catalyst, with the exception of the energy required to introduce the required amount of air into the exhaust fumes and the friction losses throughout, both being practically negligible.

It has been known for a long time in analytical chemistry the reducing action of CO, $H_2$, and hydrocarbons on copper oxide. When gas containing any or all of the above-mentioned substances, are passed over heated CuO, they are partially or totally oxidized according to the temperature of the CuO and the time of contact. As an instance, in the range of 200°–250° C. the CO, $H_2$ and certain hydrocarbons as pentane and hexane, are easily oxidized, meanwhile hydrocarbons like methane require a temperature over 600° C. for their oxidation.

In this reaction the copper oxide is successively reduced to cuprous oxide and copper.

The reaction rate for the oxidation of $Cu_2O$ or Cu to CuO, is dependent upon the temperature of the system and the concentration of the oxygen.

If a gaseous mixture containing reducing gases as $H_2$, CO and hydrocarbons and oxygen, in at least the amount required for stoichiometrically reacting with the reducing gases, is passed over cupric oxide, two simultaneous types of reaction will occur: (a) oxidation of the reduced cupric oxide by the oxygen, (b) reduction of the cupric oxide by the reducing gases.

If the reaction rate of (a) is the same or larger than (b), the end products will consist exclusively of the oxidized forms of CO, $H_2$, and hydrocarbons. In this case, the cupric oxide may be considered to have acted as a true catalyst, because it will be found chemically unaltered at the end of the reactions.

If the reaction rate of (a) is smaller than that for (b), the CuO will gradually disappear and $Cu_2O$ or Cu will appear in equivalent amounts.

The ratio of the remaining CuO to its reduced forms $Cu_2O$ and Cu will depend on the temperatures of the system and concentrations of the reacting gases.

The occurrence of this event being of no interest for the purpose at hand, it will not be further discussed.

The reaction speed for the oxidation of Cu and $Cu_2O$ in the temperature range of 150°–250° C. is, for an oxygen concentration of less than 20% by volume in the gas, smaller than the speed of reduction for the $Cu_2O$ and CuO by $H_2$, CO and hydrocarbons, the concentrations of the last mentioned being approximately as shown in Table No. 2.

It is of great importance that the reaction rate for the oxidation be of enough magnitude as to initiate and keep the catalytic combustion at temperatures in the above mentioned range, 150°–250° C., that roughly corresponds to the temperatures for the mixture of exhaust gas plus the added air for its combustion at the idling period of the engine, the temperatures of the exhaust being at a minimum in this period.

Applicant has found that by coating iron with a thin layer of CuO, the velocity of oxidation of the reduced CuO is greatly increased, and therefore the rate of catalytic combustion is also increased. At each temperature of the system metallic oxide catalyst-gaseous mixture, the rate depends in general on the concentration of the reacting gases on the immediate vicinity of the catalyst surface. If by certain means the reacting gases could be made to attain a higher concentration in the catalyst's surface than the one they have in the bulk of the gas, the rates would be correspondingly increased.

It is known that certain metals as platinum, palladium, nickel, gold, silver, etc., possess the property of adsorbing preferentially certain gases, and in some cases the adsorption can go as far as the formation of stoichiometric metal-gas compounds, all the intermediary compounds in between both extreme cases being possible.

Nickel is a good adsorbent for $H_2$, and also forms the compound $Ni(CO)_4$, nickel carbonyl, with carbon monoxide. Silver absorbs considerable quantities of oxygen when hot.

The preparation of the catalyst will now be explained.

Iron powder is immersed in a solution of a copper salt, copper sulfate as an instance, whereby a layer of copper is deposited on the surface of the iron particles. The solution, now containing also ferrous and ferric sulfates in addition to the remaining copper sulfate is drained off or filtered out. Copper coated iron is washed to free it as much as possible from the solution. This procedure may be repeated a number of times, depending on the amount of copper that is desired to deposit over the iron. Nickel powder is mixed with silver oxide powder, and subjected to reduction in a stream of hydrogen, at a temperature of 200° C. or higher.

The resulting mixture of finely divided silver and nickel are intimately mixed with the copper covered iron, and the whole subjected to sintering, in an inert atmosphere of hydrogen or nitrogen. If hydrogen is used as the inert gas, the prior step of reducing the mixture of the silver oxide with the nickel is unnecessary. The sintering may be conducted with the powder mixture under pressure if denser catalysts are desired.

Without any pressure substantially cohesive solid masses are obtained, that when disintegrated to pieces of sizes ranging between 1/16" and 1/8" have a bulk specific gravity ranging approximately from 75 to 95 pounds per cubic foot.

It is evident that the finished size pieces of the catalyst may be sintered in molds with the required size and shape, so avoiding the step of disintegration.

Temperatures for the sintering are in the order of 600° C. and higher. The solid sintered mass so obtained is ground to any convenient size or mesh. The undersize fines may be reground and sintered again.

The ground pieces are now subjected to heat in a stream of air or oxygen. At this stage, conducted at dull red temperatures or higher, the copper is oxidized to cupric oxide.

Finally, the oxidized pieces are heated to about 250°–300° C. in a stream of hydrogen, whereby the nickel oxides are reduced to metal, and the catalyst is ready for use.

The last reduction step can be dispensed with if the oxidized pieces are placed in the engine's exhaust gas stream.

The particle size of the metallic powders and the relative proportions of the same may vary between wide limits, depending on the space velocity and on the degree of fractional conversion required. By degree of fractional conversion is here understood the fraction of the reacting substances that are converted into the desired products when they pass through a certain mass or volume of the catalyst.

The smaller the particles of the metallic powders the greater the allowable space-velocity for a given fractional conversion. In plain language, that means that larger quantities of products (originated from the reacting substances) can be obtained in a given time through a given amount of catalyst if this one is made up of smaller particles.

Evidently the lower limit would be attained in the atomic scale, when the metals involved are in the state of alloys.

Applicant has prepared an alloy containing approximately 45% iron, 45% nickel, 10% silver, that was drawn into a small diameter wire (0.020"). The wire was then immersed in $CuSO_4$ solution, whereby a copper metallic layer was deposited on the surface of the wire. The wire was then oxidized in hot air, and then reduced in $H_2$, in about the same manner as explained above for the metallic powders.

For the concentrations of the combustible gases involved in the application at hand, there are two important considerations that practically set a lower limit to the size of the metallic particles. One consideration being the heat of reaction developed at the catalyst. With a very efficient catalyst the amounts of heat developed per a given volume of the catalyst in a given time may greatly exceed the dissipation of the heat (through convection, conduction and radiation) from the catalyst, with the result that the temperature of the same increases continuously, till an equilibrium temperature is reached, whereby the mechanisms of dissipation of the heat balance the heat input from the reactions. This temperature of equilibrium may reach values in the range of the melting point of the metals, with the consequence that the pieces of catalyst may fuse together closing partially or totally the pass of the gas, offering at the same time less surface to the reacting gases and also, because of the higher vapor pressure of the metals, the gas stream would carry continuously metallic vapors with the consequence of high catalyst losses.

The other consideration is economic; the smaller the particle the more expensive to produce. Silver being a relatively expensive metal, the applicant used a silver colloid instead of the $Ag_2O$ (silver oxide) described before.

In the colloidal state, very small amounts by weight of the metal offer a considerable surface area, which is of great importance in catalysis.

The colloidal silver was prepared by reducing an aqueout suspension of silver oxide, kept at about 80°–90° C. with hydrogen gas. The nickel powder was then immersed in the colloidal suspension and agitated, thereby causing the silver to deposit on the nickel particles.

Very active catalysts are obtained in this manner with nickel containing about 1% of its weight in deposited silver.

In order to show the wide relative composition range and particle size, and their connection with the activity of the resulting catalyst, a few instances are shown below.

CATALYST #1

Composition in weight percentages (approximate):
Iron, 42%; copper, 8%; nickel, 50%; traces of $Fe_2O_3$ (ferric oxide) from the ferrous and ferric sulfates left after washing the copper coated iron, MnO, $SiO_2$, from the impurities contained in the iron powder.

Particle sizes (approximately):
Iron, in the range 55 microns to 75 microns (micron=0.001 mm.).
Nickel, in the range 45 to 55 microns.

Catalyst initial temperature: 220° C.
Gas temperature before contacting catalyst: 220°–240° C.
For a space-velocity in reciprocal hours of 1500 (1/hour) the fractional conversion was:
For the CO (carbon monoxide)—0.76.
For the $H_2$ (hydrogen)—0.6.
For the hydrocarbons—0.68.

For a space-velocity of 1000 (1/hour) the fractional conversion was 0.85 or better for any of the combustible gases.

By space-velocity is here understood the volume of the gas mixture taken at standard temperature and pressure that passes once over the unit volume of catalyst during the unit time.

CATALYST #2

Composition in weight percentages (approximate):
Iron, 39%; copper, 5%; nickel, 45%; silver, 11% (plus traces as in Catalyst #1).

Particle sizes (approximate):
Iron, in the range 55 to 75 microns.
Nickel, in the range 45 to 55 microns.
Silver, obtained from silver oxide powder in the range 100 to 150 microns.

Catalyst initial temperature: 240° C.
Gas temperature before contacting catalyst: 250° C.
For a space-velocity of 250.000 (1/hour) the fractional conversion was:
For the CO (carbon monoxide)—0.85.
For the $H_2$ (hydrogen)—0.55.
For the hydrocarbons—0.38.

For a space-velocity of 100.000 (1/hour) the fractional conversion was better than 0.9 for any of the combustible gases.

CATALYST #3

Composition in weight percentages (approximate):
Iron, 40%; copper, 10%; nickel, 49.65%; silver, 0.35% (plus traces as in Catalyst #1).

Particle sizes (approximate):
Iron, 35 microns and smaller.
Nickel, 35 microns and smaller.
Silver, colloidal particle size, 0.1 micron and smaller.

The iron and nickel powders of the sizes indicated above were obtained by elutriation of commercial grades of metallic powders.

Catalyst initial temperatures: 220° C.
Gas temperature before contacting catalyst: 220°–240° C.

For space-velocity of 250,000 (1/hour) the fractional conversion was:
For CO—0.89.
For $H_2$—0.92.
For hydrocarbons—0.75.
For a space-velocity of 200.000 (1/hour) the fractional conversion was:
For CO—0.98.
For $H_2$—0.98.
For hydrocarbons—0.92.

CATALYST #4

Composition in weight percentages (approximate):
Iron, 83%; Cu, 14.5%; nickel, 2%; Ag, 0.5% (plus traces as in Catalyst #1).

Particles sizes (approximate):
Iron, 35 microns and smaller.
Nickel, 1 to 2 microns most of them, the rest smaller.
Silver, 0.1 micron and smaller (colloidal particle size).

The iron was obtained by elutriation of commercial powder. The nickel was obtained from the commercial nickel made through the carbonyl process. The silver colloid was made as already explained. The silver was deposited on the copper coated iron particles by the same procedure as was explained for the nickel powder.

Because of the smaller size of the metal particles (1 to 2 microns), they offer a considerably larger surface area than the larger particles utilized in Catalyst #2, for example (45 to 55 microns).

The aproximate area ratio for a same weight would be about 25 to 50 times depending on the relative amount of the 1 micron size particles.

Catalyst initial temperature: 220° C.
Gas temperature before contacting catalyst: 220°–240° C.

For a space velocity of 250.000 (1/hour) the fractional conversion was over 0.9 for any of the combustible gases.

Although it was heretofore not mentioned, the soot, when generated because of incomplete combustion of the fuel, may be burnt during the passage of the soot-bearing gas through the catalyst, provided sufficient air or oxygen is added to the gas.

Each of the catalysts given as examples was kept for 100 hours in a reacting gas stream, the temperatures at the catalyst were in the range 700°–750° C. No noticeable decrease in the activity of the same was observed.

What I claim is:

1. A catalyst for the oxidation of the combustible matters contained in the exhaust fumes of internal combustion bustion engines, consisting essentially of finely divided nickel particles and finely divided iron particles with their surfaces covered by a layer of copper oxide, said nickel particles and copper oxide covered iron particles being intermixed and sintered together.

2. A catalyst for the oxidation of the combustible matters contained in the exhaust fumes of internal combustion engines, consisting essentially of finely divided iron particles with their surfaces covered by a layer of copper oxide, finely divided nickel particles and finely divided silver particles, intermixed and sintered together.

3. A catalyst for the oxidation of the combustible matters contained in the exhaust fumes of internal combustion engines, as claimed in claim 2, in which the finely divided silver particles are in the range of sizes as found for the silver particles in silver colloids.

4. The process of producing a catalyst for the oxidation of carbon monoxide gas, gaseous hydrocarbons, hydrogen gas, which comprises the intimate mixing of finely divided particles of iron with their surfaces covered by a layer of copper with finely divided nickel particles, sintering the mixture of particles by the application of heat in a non-oxidizing atmosphere, the temperature of the sintering mixture being kept over 600° C., oxidizing the sintered mixture by the application of heat in an oxidizing atmosphere and finally heating the oxidized and sintered particles to a temperature between 200° C. and 300° C. in an atmosphere of hydrogen.

5. The process of producing a catalyst for the oxidation of carbon monoxide gas, gaseous hydrocarbons, hydrogen gas, which comprises the intimate mixing of finely divided particles of nickel with finely divided particles of silver and with finely divided particles of iron with their surfaces covered by a layer of copper, sintering the mixture of particles by the application of heat in a non-oxidizing atmosphere, the temperature of the sintering mixture being kept over 600° C., oxidizing the sintered mixture by the application of heat in an oxidizing atmosphere and finally heating the oxidized and sintered particles to a temperature between 200° C. and 300° C. in an atmosphere of hydrogen.

6. The process of producing a catalyst for the oxidation of carbon monoxide gas, gaseous hydrocarbons, hydrogen gas, as claimed in claim 5, in which the finely divided silver particles are in the range of sizes as found for the silver particles in silver colloids.

References Cited by the Examiner

UNITED STATES PATENTS

| | | | |
|---|---|---|---|
| 1,268,692 | 6/18 | Dewar et al. | 252—474 |
| 1,345,323 | 6/20 | Frazer et al. | 252—471 |
| 1,422,211 | 7/22 | Lamb | 252—474 X |
| 2,071,119 | 2/37 | Harger | 23—2.2 |
| 2,136,509 | 11/38 | Jenness | 252—474 |
| 2,234,246 | 3/41 | Groombridge et al. | 252—474 |
| 2,437,706 | 3/48 | Paterson | 252—474 X |
| 2,753,367 | 7/56 | Rottig et al. | 252—474 X |

FOREIGN PATENTS 418,790    10/34    Great Britain.

MAURICE A. BRINDISI, *Primary Examiner.*